Dec. 15, 1931.  M. SHULMAN  1,837,076
SOUND REPRODUCING TOY
Original Filed Jan. 27, 1928   2 Sheets-Sheet 1
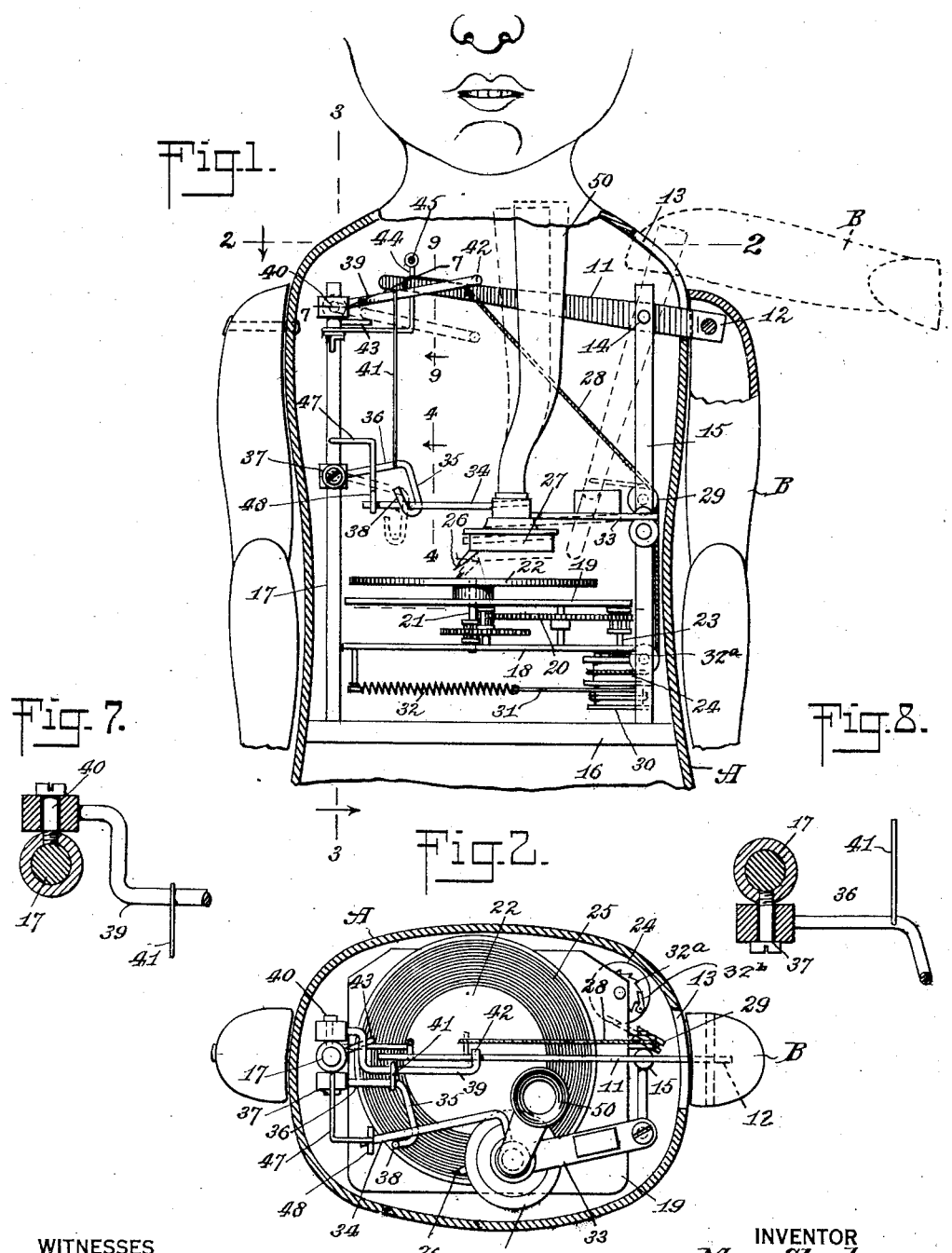
WITNESSES
INVENTOR
Max Shulman
BY
ATTORNEY Dec. 15, 1931.  M. SHULMAN  1,837,076
SOUND REPRODUCING TOY
Original Filed Jan. 27, 1928   2 Sheets-Sheet 2
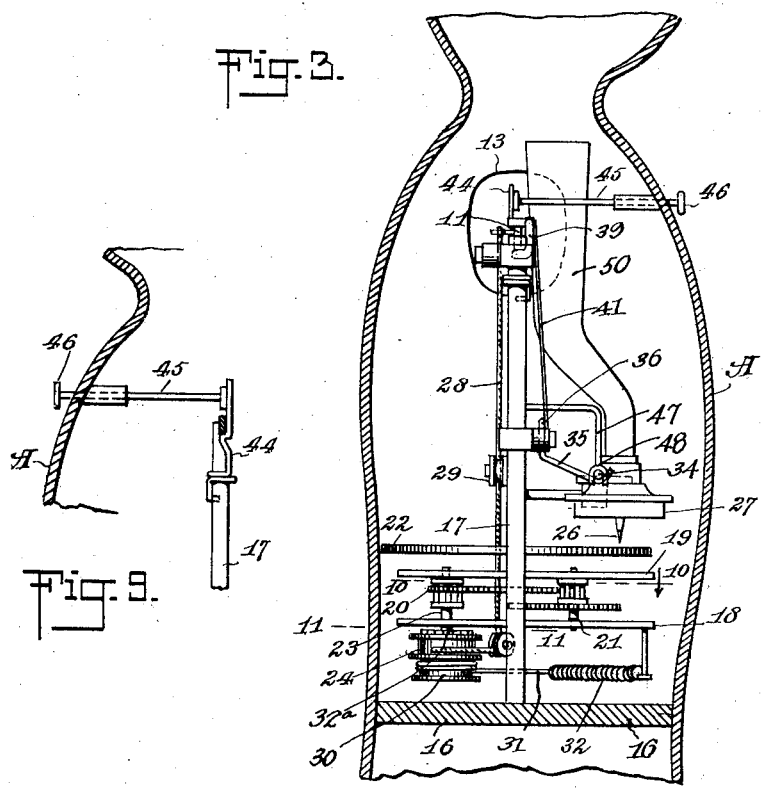
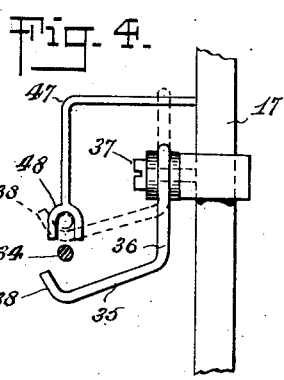
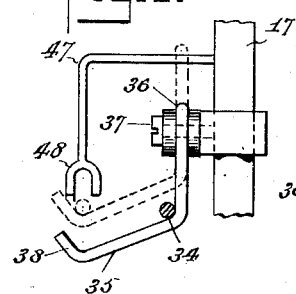
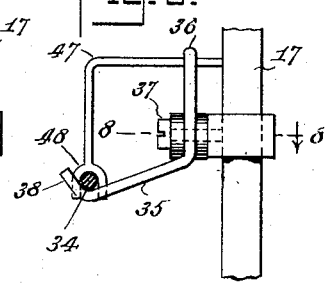
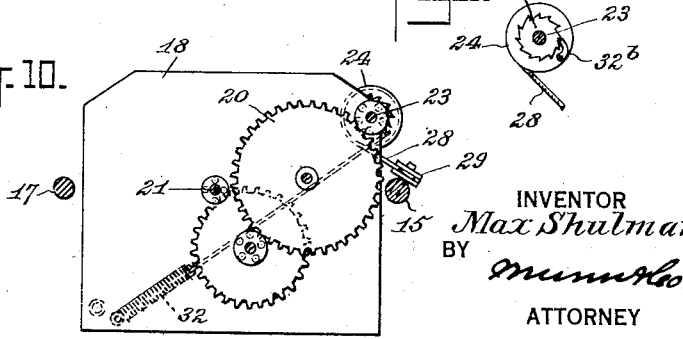
WITNESSES
William P. Goebel
Hugh H. Ott
INVENTOR
Max Shulman
BY
Munn & Co.
ATTORNEY Patented Dec. 15, 1931

1,837,076

UNITED STATES PATENT OFFICE

MAX SHULMAN, OF NEW YORK, N. Y., ASSIGNOR OF ONE-HALF TO HARRY BLUM, OF NEW YORK, N. Y.

SOUND REPRODUCING TOY

Application filed January 27, 1928, Serial No. 249,945. Renewed October 20, 1931.

This invention relates to toys, and refers more particularly to sound-reproducing toys, such as toy animals or dolls.

Broadly the invention comprises a toy animal or doll equipped with phonographic sound-reproducing means housed within the body thereof so that the toy may emit sounds which are natural to the figure which it represents.

The invention further comprises a toy animal or doll having a sound-reproducing mechanism housed within the body thereof and operable by relative movement of one of the leg or arm members with respect to the body, for actuating the sound-reproducing mechanism for reproduction of the sounds.

More specifically the invention comprises a toy animal or doll, housing a phonographic record and sound box with mechanism operable by relative movement of an arm or leg member of the toy for turning the record, disposing the stylus or needle of the sound box in contact therewith while turning, to reproduce the sounds recorded on the record and subsequently to lift the sound box stylus out of contact with the record and to return the same to the starting point for repetition of the sound reproduction.

Other features reside in the comparative simplicity of construction and mode of operation of the sound reproducing mechanism and the economy with which the same may be produced.

With the above recited and other objects in view, reference is had to the following description and accompanying drawings in which there is exhibited one example or embodiment of the invention, while the appended claims define the actual scope of the invention.

In the drawings—

Figure 1 is a fragmentary sectional view through a doll equipped with a sound reproducing mechanism constructed in accordance with the invention;

Fig. 2 is a horizontal sectional view therethrough taken approximately on the line 2—2 of Fig. 1;

Fig. 3 is a vertical sectional view taken approximately on the line 3—3 of Fig. 1;

Figs. 4, 5 and 6 are enlarged sectional views taken approximately on the line 4—4 of Fig. 1, illustrating various positions of the parts;

Fig. 7 is an enlarged detail horizontal sectional view taken approximately on the line 7—7 of Fig. 1;

Fig. 8 is a similar sectional view taken approximately on the line 8—8 of Fig. 6;

Fig. 9 is a fragmentary vertical sectional view taken approximately on the line 9—9 of Fig. 1;

Fig. 10 is a horizontal detail sectional view taken approximately on the line 10—10 of Fig. 3;

Fig. 11 is a detail sectional view taken approximately on the line 11—11 of Fig. 3, illustrating the ratchet and pawl connection.

Referring to the drawings by characters of reference, A designates the body of a doll or any other suitable toy, and B an arm member which is attached thereto for relative movement and which is preferably carried by a lever 11, one terminal 12 of which extends through a slot 13 in the body. The lever is fulcrumed at 14 in an upright or standard 15 which is suitably supported from a base 16 secured in the body A. A second standard or upright 17 combines with the standard 15 to support vertically spaced horizontal partitions 18 and 19, between which a train of gears 20 is journaled to connect the shaft 21 of a record 22 with the shaft 23 upon which a drum 24 is loosely mounted. The record 22 is of the ordinary disk type, having a spiral groove 25 with which the diaphragm-operating needle or stylus 26 of a sound box 27 is adapted to co-operate for reproducing the human voice or other sounds which have been previously recorded thereon. The lever 11 has connected therewith a cable 28 which is trained over suitable guides or sheaves 29 and which is attached to the drum 24. Any suitable means for normally rotating the drum in one direction and for tensioning the same against rotation in the opposite direction, is employed, such as a second drum 30 attached to the drum 24 and which has a cable 31 attached thereto at one end and has the opposite end connected with a suitable spring 32. A ratchet wheel 32a is secured to the shaft 23 and a spring-pressed ratchet pawl 32b is carried by the drum 24, the ratchet and pawl being so arranged that turning movement of the drum 24 in a counterclockwise direction by the unwinding of the cable 28 therefrom, causes the turning of the shaft 23 with a drum and the rotation of the record shaft 21 and record 22 in a clockwise direction. When the arm B is lifted and the lever 11 is lowered, it is obvious that the spring 32 functions to unwind the cable 31 from the drum 30, while winding the cable 28 on the drum 24, the pawl 32b freely ratcheting over the ratchet wheel 32a and not effecting a turning movement of the shaft 23, the gear train, record shaft or record.

From this arrangement it will be seen that with the arm raised to the dotted-line position illustrated in Fig. 1 and the lever 11 lowered with the cable 28 wound upon the drum 24, downward movement of the arm B to the full-line position illustrated in Fig. 1 will cause the unwinding of the cable 28 from the drum 24 and the winding of the cable 31 upon the drum 30 against the tension of the spring 32. This obviously turns the drum shaft 23 and through the train of gears rotates the record 22. The sound box 27 together with the needle or stylus 26 is supported by an arm 33 for horizontal and vertical movements and the sound box has rigidly connected therewith a horizontal rod 34 which is disposed over the inclined end 35 of a hanger 36 which is pivoted for vertical movement on a bearing presenting a horizontal axis 37. The free terminal 38 of the end 35 of the hanger is bent upwardly to constitute a stop. An actuating arm 39 is pivoted for vertical movement on a bearing presenting a horizontal axis 40, and said arm is connected to the hanger 36 by a link rod 41. The actuating arm is provided with an offset terminal 42 disposed in the path of movement of the free end of the lever 11. A suitable stop pin 43 projects radially from the standard or upright 17 and limits the downard movement of the actuating arm 39 as well as the downward movement of the hanger 36 which is connected thereto by the link rod. A latch 44 consisting of a length of spring material is attached to the upright or standard 17 and is adapted to snap under and retain the lever 11 in the raised position illustrated in full lines in Fig. 1. A push rod 45 is connected with the latch and extends through the body A to provide an externally disposed manipulating head 46 for releasing the latch. A retaining element 47 rigidly carried by the standard or upright 17 is provided with a depending bifurcated or forked terminal 48, the purpose of which will be hereinafter set forth.

In use and operation, assuming the parts to be in the full-line position illustrated in Fig. 1, the free terminal of the lever 11 is elevated to its uppermost position and engaged by the latch 44, the arm B depending alongside of the body A. In this position, the offset terminal 42 of the actuating arm 39, engaged over the upper edge of the free end of the lever 11, is holding the sound box 27 and stylus or needle 26 in an elevated position above the record 22 and out of contact therewith, by the engagement of the free upwardly bent terminal 38 of the hanger 36 under the horizontal rod 34 which is rigidly attached to the sound box. In this position, the extremity of the rod 34 is disposed between the bifurcated or forked terminal 48, as illustrated in Fig. 6, so that lateral movement of the sound box is prevented. When it is desired to cause the toy or doll to emit sounds which are recorded on the record 22, the operator presses inwardly on the manipulating head 46, effecting the release of the latch 44 from the lever 11, thereby permitting the arm B to be grasped and swung upwardly to the dotted line position in Fig. 1, thus obviously swinging the free end of the lever 11 downwardly to the dotted-line position in Fig. 1.

The downward movement of the free end of the lever 11 lowers the sound box and the stylus or needle is disposed in contact with the record groove. The actuating arm 39 and hanger 36 continue to lower until the arm 39 is arrested by engagement with the stop pin 43. The downward movement of the lever permits the spring 32 to function to unwind the cable 31 from the drum 30, simultaneously winding the cable 28 on the drum 24. During this operation it is obvious that the shaft 23 is not turned due to the ratchet-and-pawl connection. With the arm in the elevated position and the free terminal of the lever as illustrated in the dotted-line position in Fig. 1, downward movement of the arm member B and consequent movement of the free end of the terminal 11, causes the cable 28 to be unwound from the drum 24. The pawl 32b engaging the ratchet 32a, turns the shaft 23 therewith. simultaneously winding the cable 31 on the drum 30 against the action of the spring 32. The turning of the shaft 32 turns the record shaft 21 and record 22 in a clock-wise direction as viewed in Fig. 2, through the gear train 20, causing the sound-box, by the engagement of its stylus 26 with the record groove 25 to emit the sounds recorded on the record through a suitable horn or amplifier 50. Obviously, the sound box moves radially inwardly across the record and the horizontal rod 34 moves to the position with respect to the inclined end 35 of the hanger 36 illustrated in Fig. 5. Continued downward movement of the arm member B and upward movement of the free end of the lever 11, causes the lever to engage the offset terminal 42 of the actuating arm 39. This lifts the arm and through the link rod 41, the hanger 36, disposing the inclined end 35 in the position illustrated in dotted lines in Fig. 5 and effects lifting of the rod 34 and the sound box needle or stylus 26 out of contact with the record and the gravitational camming of the same to the position illustrated in dotted lines in Fig. 5. This disposes the stylus or needle 26 in an elevated position directly over the starting point of the record. At this time, the free end of the lever 11 again engages the latch 44, holds the horizontal rod 34 elevated and disposes the terminal of the rod 34 between the forked or bifurcated lower end 48 of the retaining element 47 until the next operation.

From the foregoing it will thus be seen that a sound-reproducing toy has been devised which is simple and fool-proof in construction, and which is of a highly amusing nature.

What is claimed is:

1. In a sound reproducing toy including a body and a member movably carried thereby, a sound-reproducing mechanism within the body, comprising a turnably mounted phonograph record, a gear train connected therewith, a rotary driving drum having means for normally rotating the same in one direction and for tensioning the same against rotation in the opposite direction, a ratchet connection between the drum and the gear train, a cable wound upon the drum and connected with the movable member whereby upon movement of the same in one direction, the cable is unwound from the drum to turn the record, a sound box having a diaphragm operating needle engaging the record during the turning movement of the same, and means co-operating with the sound box and actuated by the movable member for moving the needle out of contact with the record and returning the needle to the starting point of the sound groove on the record.

2. A toy comprising a body, a phonograph record, actuating means for rotating the record, a sound box and stylus, suspending means for supporting the sound box and stylus away from the record, a movable member carried by the body assuming one position to sustain the suspending means in the inoperative position of the stylus and movable into another position to release the suspending means for the engagement of the stylus with the record, and a connection between said member and said actuating means for operating the latter to rotate the record upon a subsequent movement of said member toward said one position.

3. A toy comprising a body, a phonograph record having actuating means for rotating the record, a sound box with a stylus, suspending means for the sound box and stylus, a lever movably carried by the body assuming an initial position to sustain the suspending means and the stylus in a raised position above the record and movable in one direction to release said suspending means for a gravitation of the sound box until the stylus engages the record, and a flexible element connecting the lever with said actuating means for operating the latter upon a movement of the lever toward said initial position to rotate the record.

4. A toy comprising a body, a phonograph record having an actuating means for rotating it, a sound box with a stylus, a lever movably carried by the body, a connection between the lever and said actuating means for operating the latter to rotate the record while moving the lever in one direction, and suspending means which is engaged by the lever during said movement to displace the sound box and stylus from a previous engagement of the stylus with the record.

5. A toy comprising a body, a phonograph record having an actuating means for rotating it, a sound box with a stylus, a lever movably carried by the body, a connection between the lever and said actuating means for operating the latter to rotate the record while moving the lever in one direction, suspending means which is engaged by the lever during said movement to displace the sound box and stylus from a previous engagement of the stylus with the record, and means for retaining said suspending means and lever in an initial position at the end of said movement.

6. A toy comprising a body having a movable body member, a phonograph record and an associated sound box with a stylus to engage the record, actuating means for the record including a pair of drums and a ratchet mechanism, a pivoted lever connected with and operable by said body member, said lever having a flexible connection with one of the drums for operation of the actuating means to rotate the record upon movement of the lever in one direction, and resilient means having a flexible connection with the other drum acting through the ratchet mechanism to wind the first flexible connection upon the first drum preparatory to another operation during movement of the lever in one direction.

7. A toy comprising a body, a phonograph record having actuating means for rotating the record, a sound box with a stylus, suspending means for suspending the sound box, a lever with a connection to the actuating means, and a pivot by which the lever is mounted upon the body for rocking movement for successively releasing the suspending means to lower the stylus upon the record, operate the actuating means to rotate the record, and ultimately re-engage the suspending means to raise the stylus from the record.

8. A toy comprising a body having a movable body member, a phonograph record having actuating means which includes a pair of drums and a ratchet mechanism, a sound box having a stylus engageable with the record, a flexible element connected at one end with one of the drums, a second flexible element connected with the other drum and having resilient means for idly turning the drums to wind said end upon said drum, and a lever connected with and operable by said body member, with which lever the other end of the first element is connected being movable to unwind the first end, turn the drums and operate the actuating means through said ratchet mechanism.

9. In a toy, a phonograph record having actuating means for rotating it, a sound box having a stylus to engage the record, a lever and an element connecting the lever with the actuating means to operate the later and rotate the record while moving said lever in one direction to an initial position, and a hanger for the sound box having a connected arm engageable by the lever during said movement to raise the sound box and sustain it and the stylus above the record when said initial position is reached.

10. In a toy, a phonogroph record having actuating means for rotating it, a sound box having a stylus to engage the record, a lever and an element connecting the lever with the actuating means to operate the latter and rotate the record while moving said lever in one direction to an initial position, a hanger for the sound box having a connected arm engageable by the lever during said movement to raise the sound box and sustain it and the stylus above the record when said initial position is reached, and a releasable latch then engaging the lever to maintain said position.

11. A toy comprising a body having a pivoted lever, an arm of the body pivotally connected with the lever for raising and lowering to rock the lever upon its pivot, a phonograph record and actuating means for rotating it, a sound box with a stylus, and separate means respectively under the control of the lever and connected with the lever for lowering and raising the sound box in respect to the record and operating the actuating means for rotating the record in the interim.

12. A toy having an arm and a connected cable, a sound box with a stylus, a phonograph record with which the stylus is moved into contact as the arm is moved in one direction, a drum with means to simultaneously wind up the cable, and actuating means between said drum and record set in operation to turn the record as said arm is moved in another direction and said cable is unwound from the drum.

13. A toy having an arm and a connected cable, a sound box with a stylus, a phonograph record with which the stylus is moved into contact as the arm is moved in one direction, a drum with means to simultaneously wind up the cable, actuating means between said drum and record set in operation to turn the record as said arm is moved in another direction and said cable is unwound from the drum, and means for lifting the sound box at the end of said last movement of the arm and returning said sound box and stylus to the starting position in respect to the record.

14. A toy comprising a body, a member of the body movably carried by the body, sound reproducing elements comprising a movably mounted sound record and a sound box with a stylus, and means actuated by movements of the member in reference to the body to bring said elements into operative connection and then to move one of the elements in respect to the other to produce sound.

15. A toy comprising a body, a member of the body movably carried by the body, a movably mounted sound record, a sound box and stylus, and means actuated by movements of the member in reference to the body to move the sound box toward the record for the application of the stylus and then move the record.

16. A toy comprising a body, a member of the body movably carried by the body, sound reproducing elements comprising a movably mounted sound record and a sound box with a stylus, said elements depending for operation on movements of the member, means actuated by movements of the member to bring said elements into operative connection and then to move one of the elements in respect to the other to produce sound, and a releasable latch to hold said means against actuation, hence to hold said member against movement until the latch is released.

17. A toy comprising a body having an arm which is to be moved in two directions, a normally dormant phonograph inside of the toy comprising a record and sound box-stylus, normally dormant turning means for the record, means operated by the arm upon movement in one direction to drop the sound box-stylus against the record, and means operated by the arm upon movement in the other direction to turn the record.

18. A toy comprising a body containing a record and a sound box with a stylus to produce sounds, a body member which is movable in two directions to start and stop the emission of sound, means terminating at said member which upon one movement of the member applies the stylus to the record, and upon the other movement of the member turns the record in respect to the stylus, and means brought into action at the end of the latter movement of said member to shift the sound box and disengage the stylus from the record.

19. A toy comprising a body containing a record and a sound box with a stylus to produce sounds, a body member which is movable in two directions to start and stop the emission of sound, means terminating at said member which upon one movement of the member applied the stylus to the record and upon the other movement of the member turns the record in respect to the stylus, means brought into action at the end of the latter movement of said member to shift the sound box and disengage the stylus from the record, and means then brought into play to prevent lateral displacement of the sound box.

Signed at New York in the county of New York and State of New York this 26th day of January A. D. 1928.

MAX SHULMAN.